No. 777,091. PATENTED DEC. 13, 1904.
J. H. HALLBERG.
SYSTEM OF ELECTRICAL DISTRIBUTION FOR ELECTRIC RAILWAYS.
APPLICATION FILED MAR. 14, 1904.
NO MODEL.
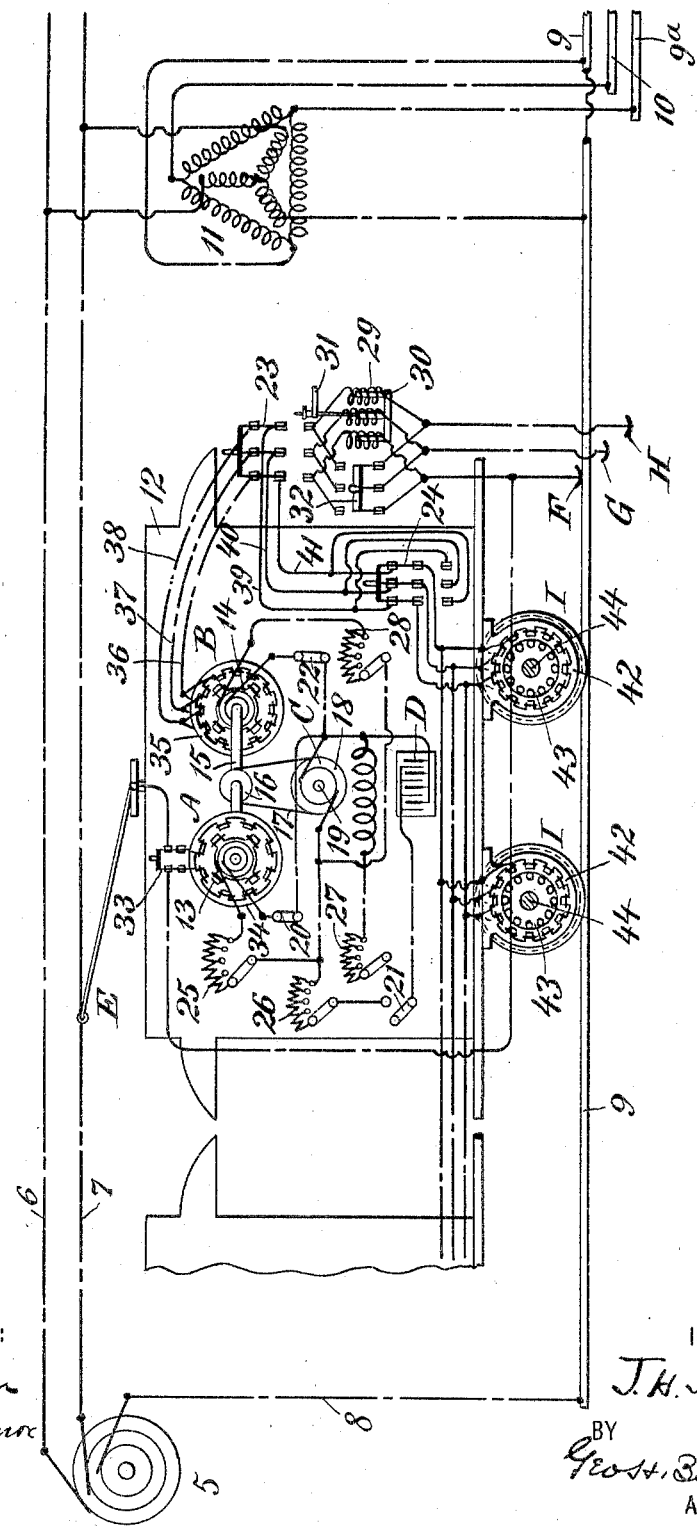
WITNESSES:
J. E. Pearson
Frank O'Connor
INVENTOR
J. H. Hallberg
BY
Geo. H. Benjamin
ATTORNEY No. 777,091. Patented December 13, 1904.

UNITED STATES PATENT OFFICE.

JOSEF HENRIK HALLBERG, OF CINCINNATI, OHIO.

SYSTEM OF ELECTRICAL DISTRIBUTION FOR ELECTRIC RAILWAYS.

SPECIFICATION forming part of Letters Patent No. 777,091, dated December 13, 1904.

Application filed March 14, 1904. Serial No. 198,029. (No model.)

*To all whom it may concern:*

Be it known that I, JOSEF HENRIK HALLBERG, a citizen of the United States, residing at Cincinnati, (Clifton,) county of Hamilton, State of Ohio, have invented a System of Electrical Distribution for Electric Railways, of which the following is a specification.

My present invention relates to a system of electrical distribution for electric railways wherein a polyphase alternating current is generated and transmitted along the railway and one phase of such current at its full voltage employed to actuate the motor-vehicles upon certain portions of the railway—as, for instance, in localities where high voltage and speed may be maintained and where the danger from contact is small—and all the phases of such current used to actuate the motor-vehicles upon other portions of the railway—as, for instance, in cities or towns, where lower voltage and speed must be used and the danger from contact is greater—and such single-phase current employed after transformation to a polyphase current through polyphase motors on the vehicles for giving motion to the vehicles.

The objects of my invention are, first, to provide means whereby vehicles upon an electric railway may be operated over the whole or a portion of such railway by means of a single-phase alternating current transmitted over a single trolley or feed wire;. second, to provide means whereby such vehicles may be operated over certain portions of the railway by a single-phase current of high voltage and over other portions of the railway by a polyphase current of a different voltage; third, to provide motor equipment which shall be without commutators or brushes and geared, if desired, directly to the axles of the vehicles, thereby doing away with the objectionable parts, allowing of high speed, and reduction in the cost of operation.

The accompanying drawing illustrates diagrammatically my system as applied to an electric railway.

The drawing illustrates the railway as divided into two sections, the section at the left indicating a country section or other location where a single-phase current of high voltage may be employed, the section at the right a city section or other location where a polyphase current may be employed.

In the drawing, 5 indicates a polyphase generator; 6 7 8, conductors leading therefrom and carried along the railway. The conductor 7 serves as a contact-conductor over that portion of the railway where the single-phase current is employed. A traffic-rail 9 forms a portion of the conductor 8. In the city section of the railway two traffic-rails 9 9$^a$ and a third intermediate conductive rail 10 are employed. Interposed between the source of polyphase currents and the three conductors 9 9$^a$ 10 of the city section of the railway is a polyphase transformer 11, which may be of any suitable type and adapted to modify the voltage of the current. Ordinarily a step-down transformer is used.

12 indicates a motor-vehicle. Situated upon this vehicle is a single-phase alternating motor A, polyphase generator B, direct-current generator C, storage battery D, trolley-contact E, and contact-shoes F G H.

The rotor members 13 14, respectively, of the single-phase motor A and polyphase generator B are positively connected through the shaft 15, on which is a pulley 16, over which passes a belt 17, which is carried over a pulley 18, mounted upon the armature-shaft 19 of the direct-current generator C.

20 21 22 are hand-switches; 23, starting-switch; 24, reversing-switch; 25 26 27 28, rheostats.

The starting device shown embodies reactive coils 29 and iron cores 30, which can be raised or lowered by manipulating the lever 31.

32 is a by-pass switch around the starting-switch; 33, hand-switch for connecting stator member 34 of single-phase motor across the conductor 7 and rail 9; 35, stator member of polyphase generator; 36 37 38, conductors from polyphase generator leading to starting-switch 23; 39 40 41, conductors leading from starting-switch to stator members 42 of polyphase motors I, whose rotor members 43 are mounted directly upon the axles 44 of the vehicle.

The operation of my improved system is as follows: When it is desired to excite the vehicles upon the railway and, further, to convert a single-phase current of high voltage into a polyphase current of different voltage, single-phase motor A upon the vehicle is brought into synchronism with the generator 5. This is accomplished by driving the small direct-current generator C as a motor by the current derived from a storage battery D and transmitting the motion of the armature of said generator, through the belt 17 and shaft 15, to the rotor members 13 14 of the motor A and polyphase generator B. When the generator 5 and motor A are in step, the switches 20 21 are closed. This causes current from storage battery D to flow through the winding of rotor 13 of motor A, thereby exciting it. When proper voltage of the motor A has been obtained, the switch 33 is thrown to connect the stator member 34 across the conductors 7 9. After the motor A has been brought up to speed it operates as a single-phase synchronous motor, driving, through the shaft 15, the rotor member 14 of the polyphase generator B and also, by means of the belt 17, the armature of the small direct-current generator C, the current from which can now be used by closing switch 22 for exciting the rotor members 13 14 of motor A and polyphase generator B and, further, for charging storage battery D. When it is desired to start a vehicle, the switch 22 is first closed, thereby permitting a small amount of direct current from the direct-current generator C to flow through the rotor member 14 of the polyphase generator B. The effect of this small current in the rotor member 14 is to induce a low voltage in the stator member 35, the current from which is transmitted through the starting-switch 23 and reversing-switch 24 to the stator members 42 of the polyphase motors I, thereby inducing movement of their rotor members 43 and through them motion to the vehicle. By reversing the position of the reversing-switch 24 the direction of motion of the vehicle may be altered, and by varying the resistance through the rheostats the speed of the vehicle may be changed as desired. When the vehicle moves into the section of the railway fed from the transformer 11, the shoes F G H make contact with the rails 9 9ª and conductor 10 and the trolley-pole E is drawn out of contact with the conductor 7. At such time the starting-switch 23 has its position reversed to coact with the lower set of contacts, the current is carried through the reactance member and regulated, after which the by-pass switch 32 is thrown to cut the reactance member out of circuit.

I have not shown any means for regulating the speed. Manifestly means such as are common for the purpose may be employed. Generally I have indicated in the drawing that the system described may be used with the usual multiple control system for starting and regulating the speed.

In a former application relating to the same subject-matter, Serial No. 195,425, filed February 26, 1904, I have given a more detailed description of the mechanism employed upon the vehicle for converting a single-phase current into the polyphase current used to actuate the vehicle, and hence I make no claim in this application for such portion of my invention.

Having thus described my invention, I claim—

1. A system of electrical distribution, comprising a source of polyphase current, conductors arranged along the railway and formed in part by one of the traffic-rails, one of said conductors serving over a portion of the railway as a contact-conductor, a polyphase transformer interposed between the source of energy the contact-conductor and the rails over other portions of the railway; a motor-vehicle, means on said motor-vehicle for converting a single-phase alternating current into a polyphase alternating current, polyphase motors for moving said vehicle, means for conveying a single-phase current to the operating mechanism of said vehicle while on certain portions of the railway, and means for conveying a polyphase current directly to the motors on said vehicle when on the other portions of the railway.

2. A system of electrical distribution, comprising a source of polyphase current, a motor-vehicle, means for starting and operating said motor-vehicle by a single phase of such current transformed into a continuously-symmetrical polyphase current when on a portion of the railway, and by all of said current phases when on other portions of the railway.

3. A system of electrical distribution, comprising a source of polyphase current, means for feeding a single phase of said current to a portion of the railway, means for feeding all of the phases of said current, but at a reduced voltage, to other portions of the railway, a motor-vehicle, means on said motor-vehicle for moving it when influenced by a single-phase current and when influenced by a polyphase current.

4. A system of electrical distribution, comprising a source of polyphase current, an electric railway divided into sections, certain of said sections fed by a single phase of said current and certain of said sections fed by all of the phases of said current, with means for altering the potential of the phases fed to said last-named sections of said railway.

5. A system of electrical distribution, comprising a source of polyphase current, a motor-vehicle, means for starting and operating said motor-vehicle by a single phase of such current when on a portion of the railway, said means comprising a single-phase motor, a polyphase generator and a polyphase motor mounted and connected on said vehicle; and by all of said current phases directly transmitted to the polyphase motor on the vehicle when on other portions of the railway.

In testimony whereof I affix my signature in the presence of two witnesses.

JOSEF HENRIK HALLBERG.

Witnesses:
H. K. PRUDDEN,
F. R. HEALEY.